(12) United States Patent
Kowalevicz et al.

(10) Patent No.: US 10,285,049 B2
(45) Date of Patent: May 7, 2019

(54) DEVICE AND METHOD FOR BASEBAND SIGNAL ENCRYPTION

(71) Applicant: Raytheon Company, Waltham, MA (US)

(72) Inventors: Andrew Kowalevicz, Arlington, VA (US); Gary M. Graceffo, Burke, VA (US)

(73) Assignee: Raytheon Company, Waltham, MA (US)

( * ) Notice: Subject to any disclaimer, the term of this patent is extended or adjusted under 35 U.S.C. 154(b) by 471 days.

(21) Appl. No.: 14/950,552

(22) Filed: Nov. 24, 2015

(65) Prior Publication Data

US 2017/0150347 A1    May 25, 2017

(51) Int. Cl.
| | |
|---|---|
| *H04W 12/02* | (2009.01) |
| *H04W 80/06* | (2009.01) |
| *H04L 9/06* | (2006.01) |
| *H04L 9/08* | (2006.01) |
| *H04W 4/80* | (2018.01) |

(52) U.S. Cl.
CPC ............ *H04W 12/02* (2013.01); *H04L 9/065* (2013.01); *H04L 9/0643* (2013.01); *H04L 9/0891* (2013.01); *H04W 80/06* (2013.01); *H04L 2209/80* (2013.01); *H04W 4/80* (2018.02)

(58) Field of Classification Search
CPC .... H04W 12/04; H04L 9/0816; H04L 9/0869; H04L 27/2075; H04L 27/362; H04L 2209/24; H04L 2209/80
See application file for complete search history.

(56) References Cited

U.S. PATENT DOCUMENTS

| | | | |
|---|---|---|---|
| 6,367,010 B1 * | 4/2002 | Venkatram | H04L 9/0822 380/262 |
| 9,697,363 B1 * | 7/2017 | Dorwin | G06F 21/60 |
| 2006/0126841 A1 * | 6/2006 | Pal | H04L 63/04 380/255 |

(Continued)

OTHER PUBLICATIONS

Ip, Ezra, et al., "Coherent detection in optical fiber systems", (Jan. 9, 2008), 40 pgs.

*Primary Examiner* — John B King
*Assistant Examiner* — Wayne An
(74) *Attorney, Agent, or Firm* — Schwegman Lundberg & Woessner, P.A.

(57) ABSTRACT

Communication devices and a method of providing secure electronic content are general described. Content is encrypted using a time-invariant encryption algorithm on the binary bits and a time-varying baseband key encryption waveform with a time-varying phase or amplitude. The content is recovered using a waveform with a reference phase mixed with a reference LO signal or combining the waveform and content using an XOR to measure a change of the phase/amplitude of the received signal relative to the LO signal. The key for the time-invariant binary bit level encryption may be communicated on a different channel than the content prior to communication of the content or concurrently with the content. The phase/amplitude of the baseband key may vary after baseband waveform encryption of a predetermined number of symbols, independent of the time, or after a predetermined time independent of an amount of baseband signal encrypted.

21 Claims, 6 Drawing Sheets

(56) References Cited

U.S. PATENT DOCUMENTS

| | | | | |
|---|---|---|---|---|
| 2009/0006259 A1* | 1/2009 | Hsi | ............... | G06F 21/105 |
| | | | | 705/59 |
| 2010/0098252 A1* | 4/2010 | Kanter | ............... | H04L 9/0852 |
| | | | | 380/256 |
| 2010/0208894 A1* | 8/2010 | True | ............... | B60R 25/24 |
| | | | | 380/270 |
| 2014/0213202 A1* | 7/2014 | Wang | ............... | H04B 1/00 |
| | | | | 455/125 |
| 2016/0034682 A1* | 2/2016 | Fiske | ............... | H04L 63/08 |
| | | | | 726/19 |
| 2016/0212616 A1* | 7/2016 | Allen | ............... | H04W 12/04 |

\* cited by examiner

DEVICE AND METHOD FOR BASEBAND SIGNAL ENCRYPTION

TECHNICAL FIELD

Embodiments pertain to providing secure communications. Some embodiments relate to encryption mechanisms and devices that provide encryption.

BACKGROUND

The use of wireless communication systems has become nearly ubiquitous, with an estimated three billion of the world population using the internet and over 60% of those users being provided connectivity through the use of a wireless communication system. In 2015, the Federal Communication Commission (FCC) considered penetration of wireless connectivity into the United States population so prevalent that wireless communications were recently regulated as a utility. With the explosion of wireless usage, however, a number of issues have arisen. One issue has arisen is the security of data, both in transmission of the data as well as storage on the device and elsewhere in the network or other servers. Personal, commercial and financial information routinely traverse various networks. The increased computational power of even relatively small devices may enable brute force attacks to overcome content encryption or provide the ability to acquire the decryption key by another means.

It would be desirable to limit the unauthorized interception and malicious use of communicated content.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
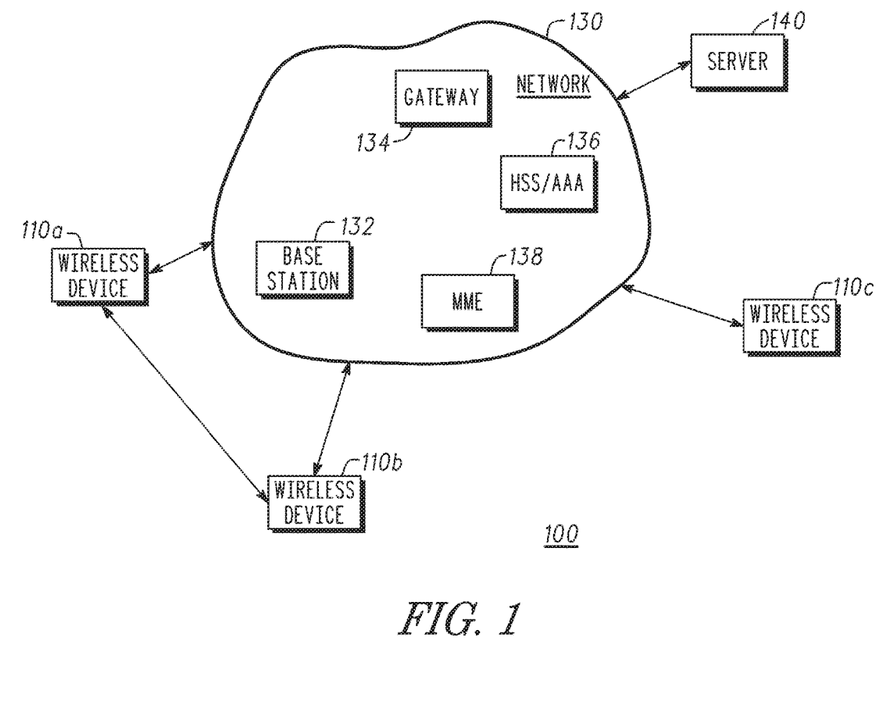
FIG. 1 is a functional block diagram illustrating a communication system in accordance with some embodiments.

FIG. 1 is a functional block diagram illustrating a communication system in accordance with some embodiments. FIG. 1 is a functional block diagram illustrating one embodiment of a network 100 in which communication devices 110a, 110b, 110c communicate with other communication devices and/or one or more servers 140. The communication devices 110a, 110b, 110c may communicate with each other directly or through one or more networks 130. The communication devices 110a, 110b, 110c may communicate wirelessly locally, for example, via one or more micro, pico or nano base stations (BSs) or access points (APs) or directly using any of a number of different techniques, such as WiFi, Bluetooth or Zigbee, among others. Alternatively, the communication devices 110 may also communicate through the network 130 via Third Generation Partnership Project Long Term Evolution (3GPP LTE) networks and LTE advanced (LTE-A) networks, $4^{th}$ generation (4G) networks or $5^{th}$ generation (5G) networks. Although wireless communications are mainly described, in some embodiments, one or more of the communication devices 110a, 110b, 110c may also or instead communicate via a wired link. Examples of communication devices 110a, 110b, 110c include, but are not limited to, mobile devices such as portable handsets, smartphones, tablet computers, laptop computers, wearable devices, and sensors. The server 140 may provide audio and/or video content or support for applications running on the communication device 110a, 110b, 110c. Note that although communication devices are shown in FIG. 1, in other embodiments, some or all of the devices may be wired devices.

The network 130 may have all of the features, hardware, and systems of networks, however, only a few elements in the network 130 are shown for exemplary purposes. The network may contain a base station (which may be e.g., an enhanced NodeB or eNB) 132, a gateway 134 (serving and/or home gateway), a Home Subscriber Server (HSS) 136, and a Mobility Management Entity (MME) 138, among others. The base station 132 may provide the initial point of connection to the network 130 by each communication device 110a, 110b, 110c. The HSS 136 may be a database of user (subscriber) information, i.e., customer profiles and provide authentication for use of the network 130 by a particular communication device 110a, 110b, 110c. The user information may include account information, account status, user preferences, features subscribed to by the user, user's current location, and allowable APNs. The HSS 136 may provide the user profile to a Mobility Management Entity (MME) 138, which controls network access of the communication devices 110a, 110b, 110c through the gateway 134. The network 130 may also contain various servers that provide content or other information related to user accounts.

During a communication session through a network, whether a local-area network (e.g., WiFi-based) or wide-area network (e.g., 4G-based), a transmitting communication device 110a may typically transmit a signal using one of a number of wireless protocols, examples of which are provided above. The signal received by a receiving communication device 110c may have a waveform that permits detection in a static fashion by the receiving communication device 110c. Devices within physical range of an open, unencrypted wireless network, may be able to capture and record the network traffic. This may permit the devices to gain unsanctioned access to internal network resources, and use information and resources therein for illicit purposes. To combat this, the signal may either be hidden or the data carried by the signal may be encrypted.

Traditional binary bit level encryption converts plaintext (readable data that are used as an input to the encryption algorithm) into ciphertext (encrypted data). The ciphertext is the resultant binary sequence of bits that contain all data to be transmitted, protected by encoding of the encryption algorithm. Various key-exchange based protocols have been developed in which, for example, private keys are exchanged between communicating devices prior to transmission of the encrypted data, public keys are provided during the data transmission and the combination of the public and private keys are used for encryption and decryption by both devices. The data may be encrypted using one of a number of techniques, such the Wired Equivalent Privacy (WEP) encryption standard, the Wi-Fi Protected Access (WPA and WPA2) security protocols, Temporal Key Integrity Protocol (TKIP), or different flavors of the Extensible Authentication Protocol (EAP). The encrypted bit sequence may then be encoded (line coding for digital communication) and directly transmitted at baseband, or modulated onto a carrier before transmission. For a given binary bit sequence, encoding scheme and modulation format (when applicable), however, the transmitted signal will always be the same.

Whether or not the transmitted data are encrypted, any device along the communication path (e.g., near either transmitting wireless device 110a or receiving wireless device 110c) or within range of either the signal transmission or reception location, and that has knowledge of the characteristics of the transmission may also be able to detect, capture and save the signal waveform. Once captured, encryption of the binary bit sequence may delay access, but eventually the content may be used by an unauthorized party. To combat this issue, other techniques may be used to prevent the signal from being detected. These techniques may include frequency hopping, spread spectrum broadcast and numerous other low probability of intercept or low probability of detection (LPI/LPD) approaches. One or a combination of hiding the signal and encryption of the data may be used. Since LPI/LPD approaches may not work well for large bandwidth, high data rate communications, which are becoming increasingly prevalent with the advent of streaming video and other data-intensive applications, other security mechanisms are thus desirable.

Figure 2:
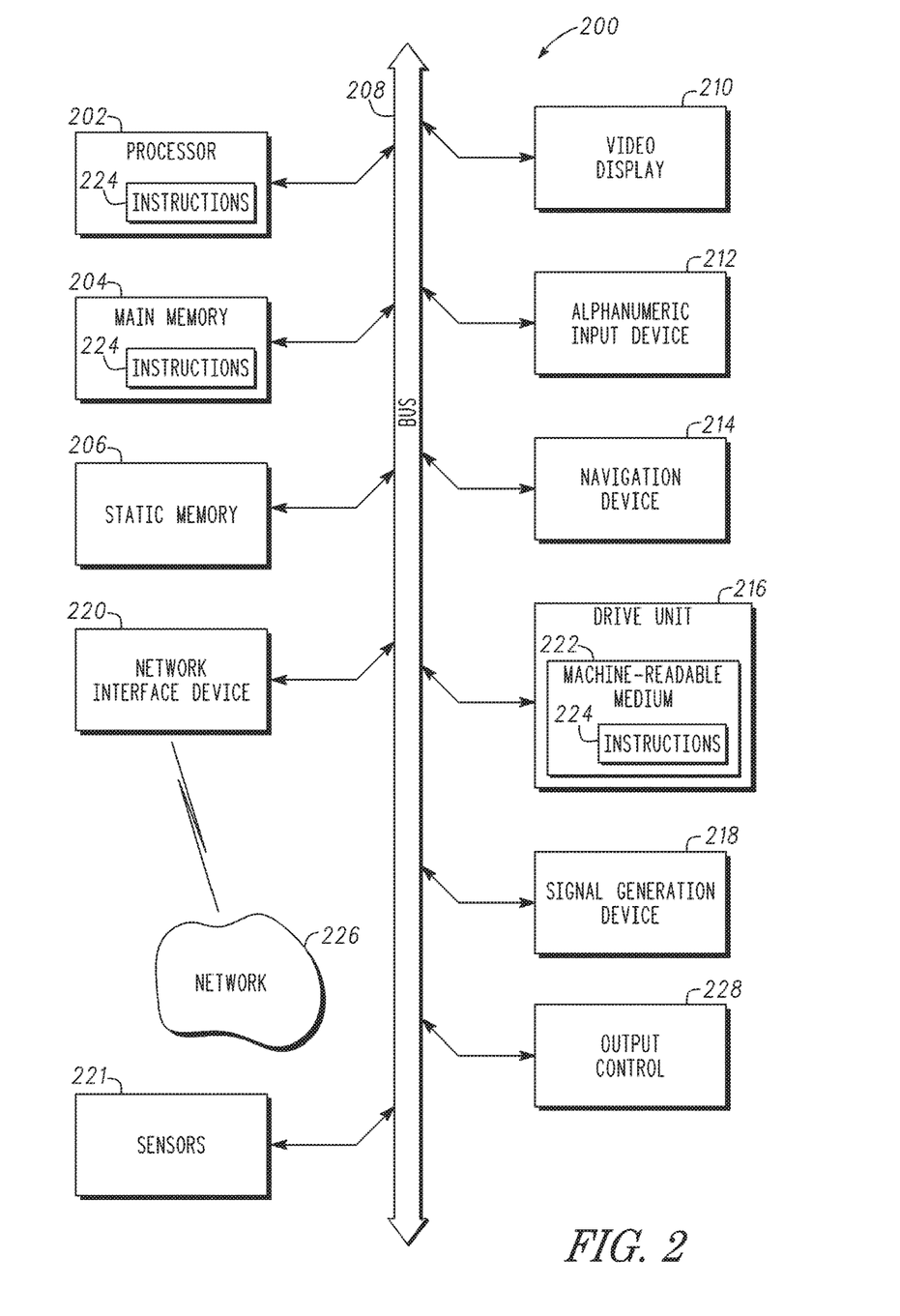
FIG. 2 illustrates a block diagram of a wireless device in accordance with some embodiments.

FIG. 2 illustrates a block diagram of a wireless device in accordance with some embodiments. In some embodiments, the wireless device 200 may be the wireless device shown in FIG. 1, and may be a computer configured to perform any one or more of the techniques during transaction events discussed herein. In alternative embodiments, the wireless device 200 may operate as a standalone device or may be connected (e.g., networked) to other computers. In a networked deployment, the wireless device 200 may operate in the capacity of a server, a client, or both in server-client network environments. In an example, the wireless device 200 may act as a peer machine in peer-to-peer (P2P) (or other distributed) network environment. The wireless device 200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The wireless device 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The wireless device 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The wireless device 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The wireless device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the wireless device 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the wireless device 200 and that cause the wireless device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, optical fiber, or phone jacks) or one or more antennas to connect to the communications network 226.

This disclosure introduces encryption of the baseband signal, which may be understood by analogy to traditional binary bit level encryption. In this case, however, protection of the data may be performed by modifying the baseband signal representation of the binary bits. Table 1 provides the terms and definitions for this new approach. One characteristic of baseband encryption that may distinguish it from traditional encryption includes that the binary bit sequence may not uniquely determine the baseband signal; the transmitted baseband signal may be modified by a baseband key waveform that may vary the magnitude or phase from the expected baseband representation.

TABLE 1

| | Traditional Encryption | | Baseband Waveform Encryption |
|---|---|---|---|
| Cleartext | Readable data transmitted or stored unencrypted - in this disclosure, cleartext refers specifically to unencrypted binary bits. | Clearbase band | Signals without modulation, that is, without any shift in the range of frequencies of the signal. For digital signals, the line coded binary bit sequence or the digital baseband modulation. |
| Plaintext | The binary bit input to an encryption algorithm. Cleartext becomes plaintext when used as in input to an encryption algorithm. | Plainbase-band | The baseband signal that is used as the input to baseband waveform encryption. Clearbaseband signals become plainbaseband signals when used as inputs to waveform encryption. |
| Ciphertext | The encrypted output from an encryption algorithm - in this disclosures ciphertext is an encrypted steam of binary bits. | Cipherbase-band | The plainbaseband signal with modified amplitude or phase based on a known operation determined by the baseband key. The output signal of baseband waveform encryption. |
| Encryption Key | Information that determines the how the plaintext gets converted to ciphertext or visa versa how it is converted back. | Baseband Key | A time-varying signal that determines the how the plainbaseband signal gets converted to, and back from, a cipherbaseband signal. |

Figure 3A:
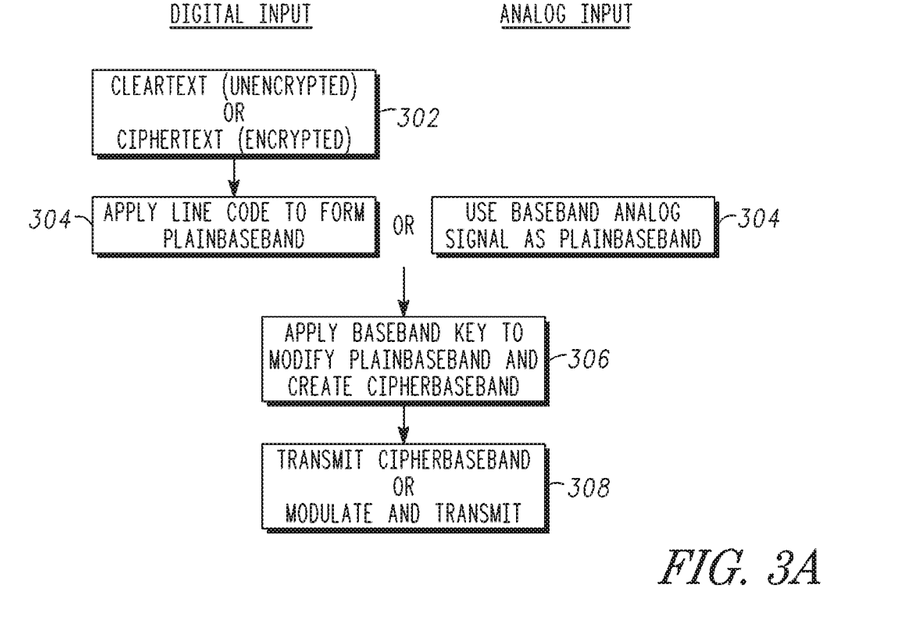
FIGS. 3A and 3B illustrate flowcharts of using baseband waveform encryption to protect data from unauthorized capture in accordance with some embodiments.
Figure 3B:
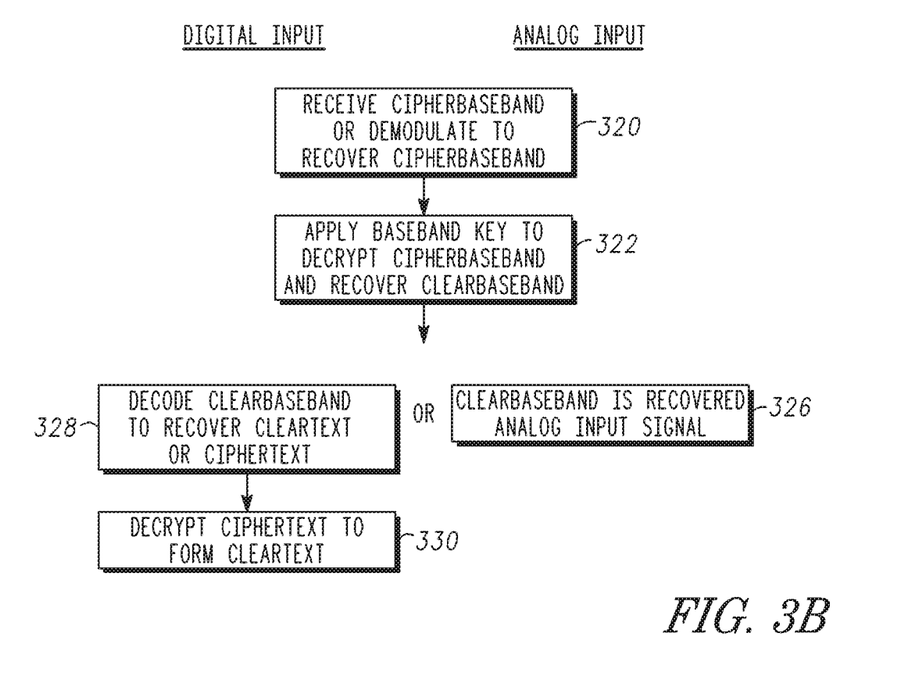
Figure 4:
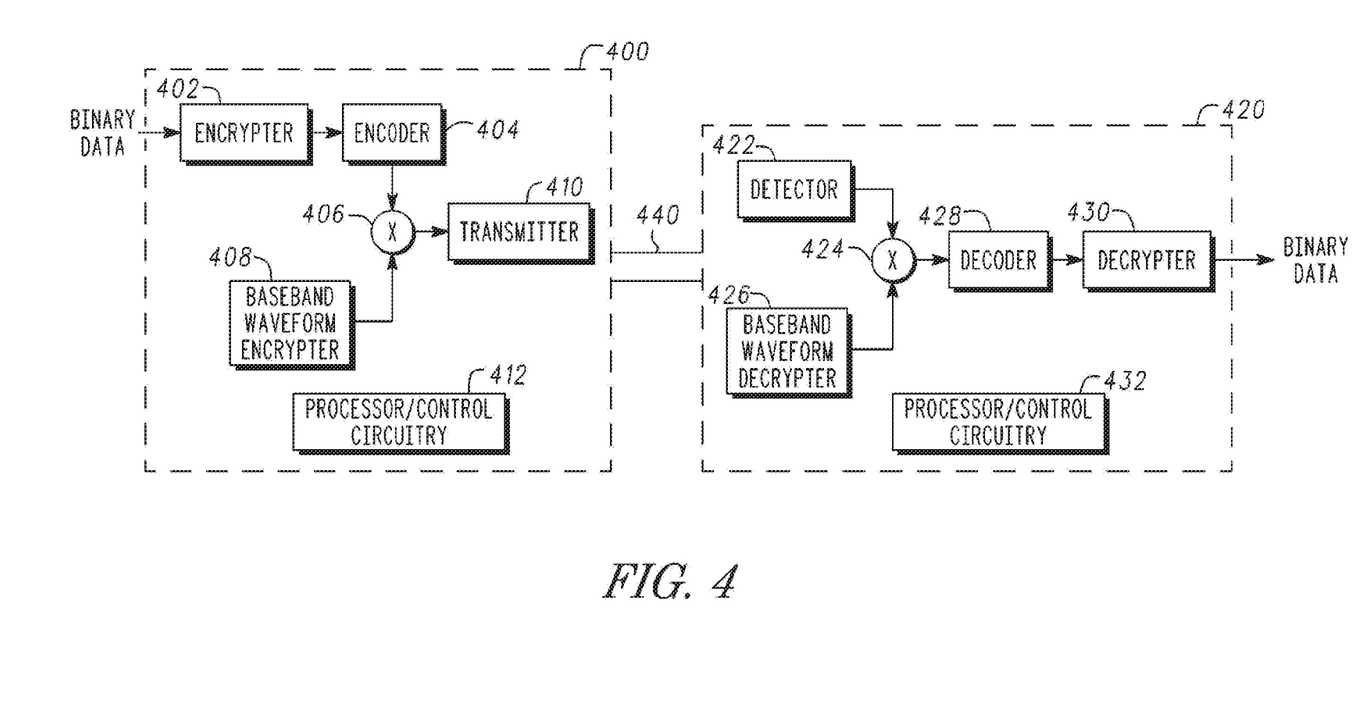
FIG. 4 illustrates a block diagram of a transmitter/receiver pair in accordance with some embodiments.

FIGS. 3A and 3B illustrate flowcharts of using baseband waveform encryption to protect data (encrypted at the binary bit level or otherwise) from unauthorized capture in accordance with some embodiments. The process shown in FIGS. 3A and 3B may be performed respectively at the transmitting and receiving device. Examples of the transmitter and receiver are shown in FIGS. 1 and 2 as the wireless devices and/or server, for example. In addition, FIG. 4 illustrates a block diagram of a transmitter/receiver pair in accordance with some embodiments. Although examples are shown in which the transmitting and receiving devices are wireless devices, in some embodiments the transmitting and/or receiving devices may be wireline devices, such as optical fiber connected devices.

As above, although concealing the communication signal may be desirable, typical LPI/LPD approaches may not work well for many current types of communications. Traditional encryption, too, may have inherent weaknesses, such as safe and secure key distribution, or vulnerability to side-channel attacks that allow saved encrypted data to be decrypted at a later date. To overcome these issues, in some embodiments the binary bit level content may be prevented from being captured and saved through the use of baseband waveform encryption. If the received signal is a cipherbaseband signal, and is decoded without applying the appropriate baseband key, the bit level data content may be rendered unrecoverable.

In operation 302 of FIG. 3A in the transmitter 400 shown in FIG. 4, plaintext (i.e. cleartext used as input to encryption) that has been generated at the transmitter 400 may be encrypted at an encrypter 402 to form ciphertext. In some embodiments, the key used to form the ciphertext may comprise a static key and/or a time-dependent key. The plaintext may be textual data, audio data or visual data generated by a user, for example, and may contain content desired to be received at one or more receivers. The plaintext may be converted to ciphertext using a predetermined encryption algorithm known to both the transmitting device and the receiving device and using a predetermined encryption key. The encryption algorithm may be time-invariant (non-time varying) and may be selected from one of a number of different types of algorithms including hashing algorithms such as Message Digest 5 (MD5) and Secure Hashing Algorithm (SHA), symmetric algorithms such as Data Encryption Standard (DES), Advanced Encryption Standard (AES), and International Data Encryption Algorithm (IDEA), and asymmetric algorithms such as RSA and Diffie-Hellman. The encryption algorithm used may not vary in time such that the key is time-invariant. The key for the encryption may be transmitted to the receiver concurrently with the encrypted data on a different channel or prior to or after data transmission.

In some embodiments, quantum key distribution (QKD) may be used to safely distribute the key used to decrypt the ciphertext. QKD, however, if implemented through the use of new network architecture and hardware, may be environmentally sensitive and may not address the ability to capture and save the transmitted data. In fact, parallel research on quantum computers promise to be able to crack encryption keys at unprecedented rates, making sensitive data accessible in significantly less time than is currently possible. Thus, the use of QKD alone may still engender several above vulnerabilities.

The ciphertext may then be encoded at operation 304 by an encoder 404 using a predetermined baseband digital format or line code scheme to produce a clearbaseband signal. The encoding scheme may include, for example, Alternate Mark Inversion (AMI) Return-to-Zero (RZ), Non-Return-to-Zero (NRZ), Manchester Coding, Pulse-Position Modulation (PPM), among others. In some embodiments, baseband waveform encryption may be performed using a physical process (such as mixing the plainbaseband signal with the baseband key, XOR gates etc. . . . ). In some embodiments, baseband waveform encryption may be implemented algorithmically whereby the conversion of plainbaseband to cipherbaseband is accomplished by a software program with the resultant magnitude or phase information being used to drive a physical encoder to create the actual cipherbaseband waveform.

At operation 306, a baseband waveform encryption may be applied to the plainbaseband signal to create a cipherbaseband signal. As shown in FIG. 4, the baseband signal generated at operation 304 may be provided to a combiner 406, where the plainbaseband signal may be modified by a real-time (i.e., time-varying) baseband key generated by a real-time baseband waveform encrypter 408. The baseband waveform encryption may provide an additional layer of security in which the encryption key, the baseband key, itself may vary with time. Specifically, in some embodiments, the baseband key may vary after a predetermined amount of time, such as 1 μs or 1 ms, has passed, independent of the amount of baseband signal encrypted or after a predetermined number of symbols having been encrypted, independent of the time. In some embodiments, information regarding the number of symbols remaining prior to the baseband key varying may be transmitted to the receiver prior to initiation of transmission of the content to the receiver. In some embodiments, the phase or amplitude of the baseband key may change and thus real-time knowledge of the baseband key at the time of encryption may be used by the receiver. If the cipherbaseband signal is decrypted without the appropriate baseband key, the binary bit data content may be rendered unrecoverable. Although the baseband signal encryption described herein may change the amplitude or phase of the plainbaseband signal, in some embodiments the remapping may not change the symbol represented by the cipherbaseband signal when measured by a standard receiver. In other embodiments, the remapping described herein may change the amplitude or phase of the plainbaseband signal as well as changing the symbol represented by the cipherbaseband signal when measured by a standard receiver.

At operation 308, the cipherbaseband signal may be transmitted from the transmitter 400 to a receiver 420. The cipherbaseband signal may use any type of transmission medium, including, for example, wireless or wired transmission or, as illustrated in FIG. 4, an optical fiber 440. Thus, the transmitter 400 may contain, for example, an RF or optical transceiver or laser 410. The transmitter 400 may contain one or more processors and other control circuitry 412 that control the various components of the transmitter 400. In some embodiments, the processor and control circuitry 412 may replace some of the components of the transmitter 400, such as the encrypter 402 or baseband waveform encrypter 408.

In some embodiments, optical transmissions may be used to carry communication signals along a communication channel between the transmitter 400 and receiver 420. The optical communications may be carried, for example, through a single mode or multi-mode optical fiber 440.

As shown in FIG. 4, the baseband key may be produced by a real-time encrypter and decrypter disposed respectively within the transmitter and receiver. In other embodiments, the baseband key waveform may be generated remotely and transmitted to either or both the transmitter and receiver. For example, the baseband keywaveform may be generated by the transmitter and sent to the receiver or generated by the receiver and transmitted to the transmitter. In some embodiments, a third party may generate the baseband key and send the waveform to the transmitter and receiver to permit the baseband key to be used by the transmitter to baseband waveform encrypt the message to be decrypted by the same baseband key at the receiver.

The cipherbaseband signal may be transmitted through a network, such that shown in FIG. 1. In other embodiments, the cipherbaseband signal may be modulated onto a carrier or may be transmitted directly between the transmitter and receiver. At operation 322, the cipherbaseband signal may be received at a receiver 420. The receiver 420 may contain, for example, an RF or optical transceiver/photodetector 422 that is configured to receive the transmission at the transmission frequency.

At operation 322, a baseband key may be applied to decrypt the cipherbaseband signal and recover the clearbaseband signal. A baseband waveform decrypter 426 may generate a baseband key having a modulated reference local oscillator (LO) signal, which may be combined at the combiner 424 to measure the time-varying phase change of the time-varying cipherbaseband relative to the reference LO signal. As shown in FIG. 4, the combined signal may produce an output that comprises a modulated signal (the clearbaseband signal).

If, for example, the baseband waveform encryption varies in time (e.g., the baseband key is time-varying), the manner in which the variation occurs may be transmitted along with cipherbaseband signal. The variation may be transmitted as text to which the waveform encryption has not yet been applied, e.g., either as cleartext or a ciphertext, at a predetermined position in the transmission. The predetermined position may be at the beginning or end of the transmission or a number of bits into the transmission that is either established or itself varies in a known manner, such as being dependent on the time or number of bits of the transmission. In some embodiments, the variation may be transmitted concurrently (or non-concurrently) with the baseband waveform encryption but on another channel to which the receiver is able to tune. In some embodiments, the transmitter and receiver may use time-derived information to generate the cipherbaseband signal and regenerate the clearbaseband signal, and thus a timestamp of generation of the cipherbaseband signal may be used by the receiver. The timestamp of transmission may also be used if the variation does not change between generation and transmission. The variation may be constant throughout the transmission or may vary during the transmission.

The clearbaseband signal obtained from the application of the baseband key at operation 322 may then be decoded at operation 324 by a decoder 428. The ciphertext or cleartext (if bit-level encryption is foregone) may be recovered in the decoding process.

At operation 328, a decryption algorithm may be applied to the regenerated ciphertext at a decrypter 430 to form the cleartext. The decryption algorithm applied by the decrypter 430 may be symmetric or asymmetric to the encryption algorithm applied at the transceiver 400. The cleartext may then be processed and stored by the receiver 420 to display or otherwise play or provide the information contained in the cleartext to a user. The receiver 420 may contain one or more processors and other control circuitry 432 that control the various components of the receiver 420, such as by parsing timing information of the received signal and providing the information to the baseband waveform decrypter 426. In some embodiments, the processor and control circuitry 432 may replace some of the components of the receiver 420, such as the decrypter 430 or waveform decrypter 426.

Figure 5:
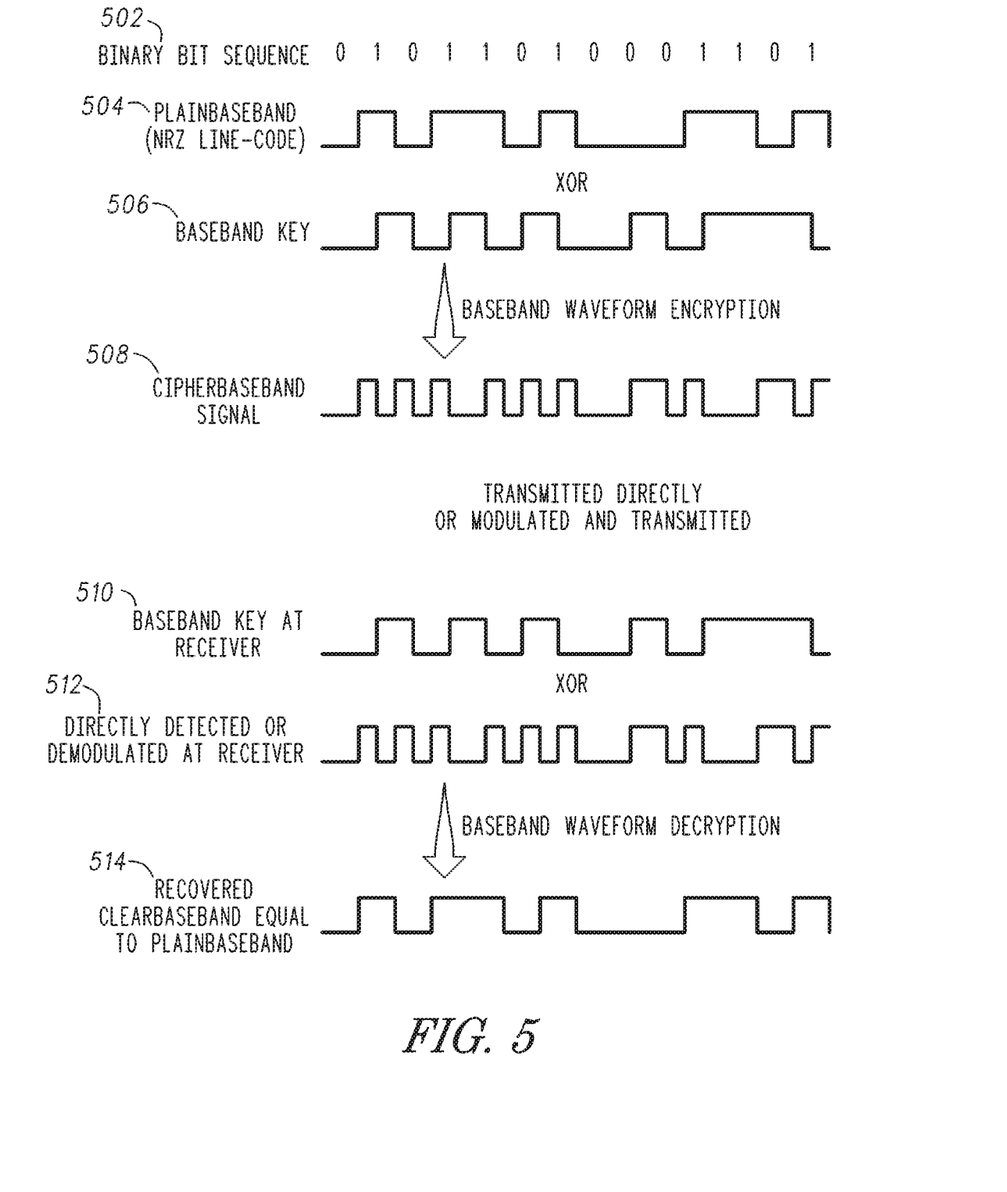
FIG. 5 illustrates waveforms of various operations in accordance with some embodiments.

FIG. 5 illustrates digital waveforms of various operations in accordance with some embodiments. In particular, one example of a transformation between a binary bit sequence, containing user content (e.g., voice, video, or textual content generated by a user) and a cipherbaseband signal at the receiver and transmitter, such as that shown in FIG. 4 is shown. The plainbaseband signal 504 may be, for example as shown in FIG. 5, a non-return-to-zero (NRZ) waveform. The plainbaseband signal 504 may have any number of bits, as determined by the type of communication and network, such as the 14 bit sequence 502 as shown in FIG. 5.

The pattern of the baseband key 506 may be known or knowable by, as well as generated by, both the transmitter and the receiver. The baseband key 506 may be generated from a pseudorandom sequence (generated by a known seed) or a truly random sequence, either of which may be performed in real-time, or may be from a predetermined list having one or more values generated and stored at the different devices (transmitter and receiver). The baseband key 506 may have the same or a different number of symbols as the plainbaseband signal 504. The baseband key 506 may use a random or pseudo random reference point to serve as a dynamic reference signal, such as one based on a Gaussian distribution, rather than using a static reference source, to generate the baseband key encryption.

In FIG. 5, the plainbaseband signal 504 and baseband key waveform 506 may be offset in time by one or more fractional bit periods prior to being combined. The amount of offset may change over time, e.g., from bit period to bit period or between sets of bit periods. The plainbaseband signal 504 and baseband key 506 may be combined algebraically to form a cipherbaseband signal 508. For example, the plainbaseband 504 and waveform key 506 may be combined using an 'exclusive or' (XOR) operation, effectively doubling the number of apparent bits in the cipherwaveform 508 compared with the plainbaseband 504 and baseband key 506 when the plainbaseband 504 and baseband key 506 have the same number of symbols.

This cipherbaseband signal may then be directly transmitted at operation 308 through the network(s) to the receiver from the transmitter. In some embodiments, the cipherbaseband signal may be transmitted directly to the receiver, such as by using device-to-device (D2D) communication. The direct communication may be part of an adhoc network or network-assisted. In other embodiments, the cipherbaseband signal may be modulated onto a carrier and then transmitted.

The reverse process may take place at the receiver. In particular, in some embodiments, the line-coded cipherbaseband signal 510 may be initially received by an antenna and detected by the detector at the receiver. Alternatively, an antenna may receive a modulated signal that is demodulated at the receiver to regenerate the cipherbaseband signal 510. A copy of the baseband key 512 may be either generated by the receiver or received from the transmitter or another network entity in a separate communication, using the same or a different communication path (e.g., over the same network connection or through different network connections such as the internet and a virtual private network). The baseband key 512 may be applied at the detector with the appropriate bit offset and at the appropriate position in the sequence. Thus, after a second XOR operation is performed, the clearbaseband signal 514 may be recovered.

The decryption key may then be applied at the bit level (if traditional encryption is used) to recover the cleartext. Without knowledge of the baseband key at the appropriate time, the message content of the transmission from the transmitter may not be recoverable at the receiver. Any other device that captures the transmission may be unable to recover the content without knowledge of all of the various pieces of information used to encrypt the original content, including the encryption key, the baseband key, the offset amount and the sequence location.

Figure 6:
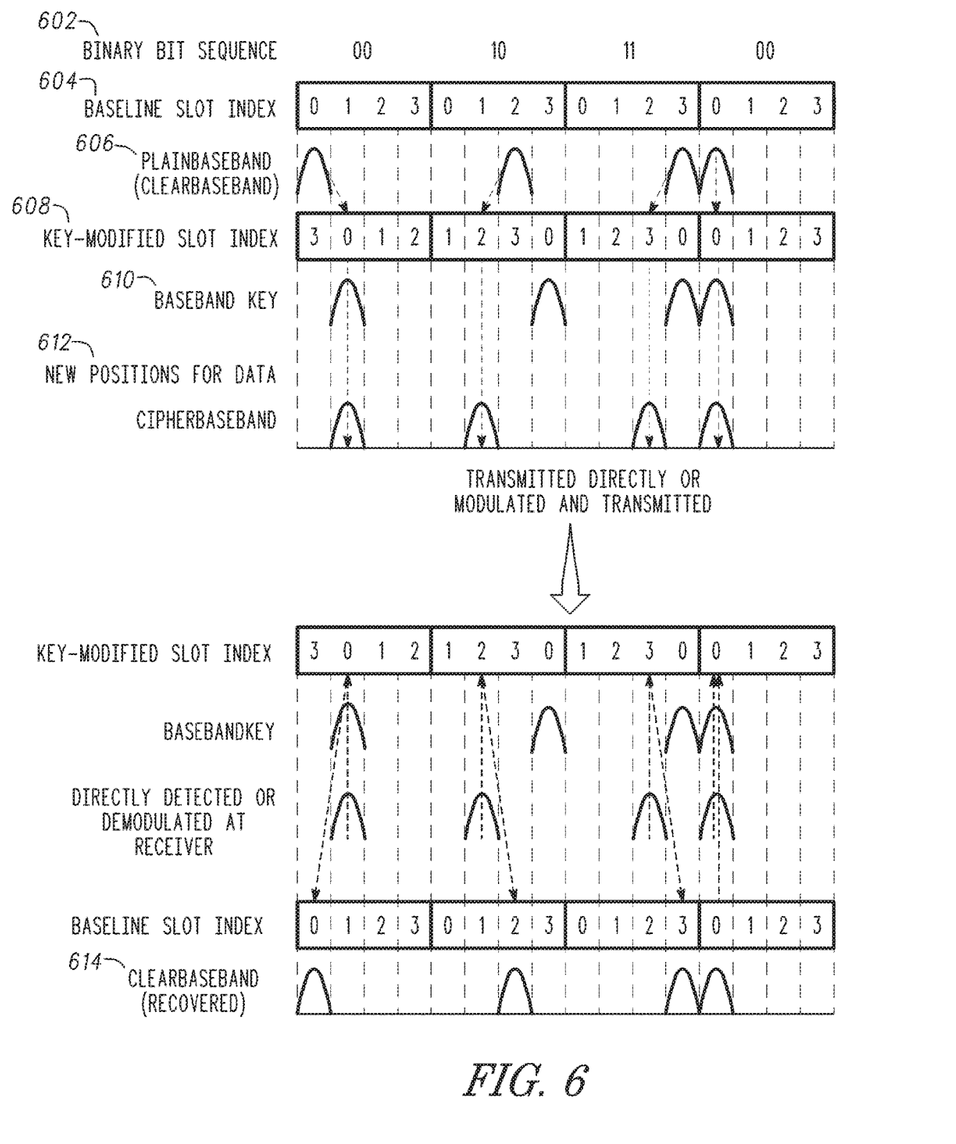
FIG. 6 illustrates waveforms of various operations in accordance with some embodiments.

In some embodiments, pulse position modulation (PPM) may be used to transmit content between devices. Similar to the process shown in FIG. 3 and performed by a transmitter and receiver such as that shown in FIG. 4, content in the form of plaintext may be encrypted to form ciphertext, which may subsequently be line-coded using a predetermined baseband format to produce a clearbaseband waveform and further waveform encrypted using a baseband key. FIG. 6 shows a transformation between a 2-PPM clearbaseband signal and a 2-PPM cipherbaseband signal in accordance with some embodiments.

In pulse position modulation, information may be encoded in the location of a pulse with respect to a fixed and known location within a single data frame (the frame has a fixed time period that is divided into $2^M$ time slots for M-ary PPM). The relationship between pulse position and the binary bits that the pulse position represents may remain static, such that if a pulse in slot x represented a particular sequence of binary bits, any pulse in the train that falls in slot x may also represent that sequence. The relationship between pulse position and the bit sequence that the pulse position represents may also be dynamic, generated using a dynamic reference signal. In such a case, if a pulse in slot x represents a sequence of binary bits, any pulse located in slot x within an assigned time period, composing one or more data frames, may also represent the particular sequence of bits, with the particular binary bits being represented changing over time. The duration over which a particular representation is static may be temporally determined such that the translation between position and representation is time dependent (based on wall clock time) and independent of the amount of data being transmitted or after a predetermined number of frames, independent of the (wall clock) time. In some embodiments, information regarding the number of frames remaining prior to the waveform representation varying may be transmitted to the receiver prior to initiation of transmission of the content to the receiver.

In the example shown in FIG. 6, the plainbaseband signal 606 may contain content and may have a train of four pulses in a 2-PPM line-code, in which each pulse may be disposed in one of four slots (delays) defined by a baseline position index 604 of delay values 0-3 over a period of four frames. Each slot in a particular frame may define a particular delay from a set point or predetermined event, such as the start of the particular frame. In other embodiments, the positions may be defined by its relative delay from a different event, such as the end of the period.

In some embodiments, the baseline position index 604 may be used in conjunction with the plainbaseband signal 606 and may remain constant between frames. In this case, the same delay of a pulse of the plainbaseband signal 606 in a first and a second period may correspond to the same binary bit sequence. The baseband key 610 likewise may be used to define a key-modified slot index 608. The key-modified slot index 608, rather than having values that remain constant between frames, may have values whose positions may vary between frames or between sets of frames. In this case, the same delay of a pulse in a plainbaseband signal 608 in a first and a second period may correspond to different binary bit sequence. The variation in the key-modified slot index 608 may be generated by using a dynamic reference signal to modify and define the correspondence among the different delays. In some embodiments, the dynamic reference signal may change between different positions that indicate an initial value for the delay (i.e., where the 0 value is) in a particular frame.

As shown in FIG. 6, both the baseline slot index 604 and the key-modified slot index 608 may be incrementally cyclic, in which values increment with an incremental change in delay (i.e., from one position to an adjacent position) until all values are provided in the period. In some embodiments, however, either or both the baseline slot index 602 and the key-modified slot index 606 may not be incrementally cyclic. In this case, the index may have at least one value that does not change in a continuously incremental manner with an incremental change in position (e.g., 0, 2, 3, 1 or 0, 1, 3, 2 rather than 0, 1, 2, 3 or 1, 2, 3, 0). However, all values may still be present in any frame.

In some embodiments, the correspondence of a delay and binary bit representation for either the baseline slot index 604 or the key-modified slot index 608 may change from frame to frame. In some embodiments, the correspondence may remain the same. For example, in the first and second frames shown in FIG. 6, the key-modified slot index 608 is (3012) and (1230), respectively. Both of these are incrementally cyclic, and the initial value has shifted by a delay of two slots between the frames so that none of the values between the first and second periods remains the same (i.e., a pulse in the same position represents a different binary bit sequence). In the second and third frame, the key-modified slot index 608 remains (1230), so that the binary bit sequence represented by a particular slot remains the same between the second and third periods. The behavior of the baseline slot index 604 and the key-modified slot index 608 with respect to the manner in which each changes from frame to frame may be independent of each other.

The cipherbaseband signal 610 for the PPM format may be created by adding or subtracting a known time or phase deviation to each of the pulses within the plainbaseband pulse train. In FIG. 6, the difference in slots (or delays) of the PPM between the plainbaseband signal 606 and the baseband key 610 may be determined in each frame. The difference may then be encoded using the key-modified slot index 608 and transmitted as the cipherbaseband signal. For example, as shown in FIG. 6, the baseband key 610 defines the new slot-0 (and subsequent slots) for each of the four frames shown. The slot position of the cipherbaseband pulses 612 in each of the four frames is thus merely the slot position of the plainbaseband pulses 606 as indicated by the key-modified slot index 608. After the cipherbaseband signal is generated, it may be transmitted directly or modulated onto a carrier and then transmitted.

At the receiver, the cipherbaseband signal 612, either directly detected or demodulated (depending on how it was transmitted), may be measured against the baseband key 610 to decrypt deviations applied at the transmitter. The baseband key 610 is either generated by, or received at, the receiver. The baseband key 610 may effectively provide a reference from which to determine the slot position for each pulse of the cipherbaseband signal 612. By measuring the relative delay between pulses of the cipherbaseband signal 612 and the baseband key 610, the clearbaseband signal 618 may be able to be recovered.

For example, as shown in FIG. 6, the receiver may determine that there is no difference in delay between the pulses of the cipherbaseband signal 612 detected at the receiver and the baseband key 610 at the receiver in the first frame. The receiver may use the baseline slot index 602 to determine that the clearbaseband pulse in the first frame should be in the location corresponding to 0 delay and generate a pulse at that location. The receiver may next determine that there is a delay difference of two positions between the pulses of the cipherbaseband signal 612 detected at the receiver and the baseband key 610 at the receiver in the second frame. The receiver may use the baseline slot index 602 to determine that the clearbaseband signal pulse in the second frame should be in the slot corresponding to a delay of two and generate a pulse at that location. This may continue until all of the pulses of the cipherbaseband signal 612 are detected and the clearbaseband signal 614, equivalent to the plainbaseband signal 606 is regenerated. Thus, a pulse of the cipherbaseband 612 that appears to represent binary bits associated with delay zero may actually be in slot n, as indicated by the key-modified slot index 608.

The baseband key may be transmitted to the receiver or generated at the receiver by a known algorithm. In some embodiments, the keywaveform may drive a sampling device (not shown) in the receiver 420 to aperiodically sample the incoming cipherwaveform and recover the clearwaveform.

The approach described above has numerous implementations and should not be limited to the specific example above, but pertains in general to any case where the transmitted waveform itself is to be compared, combined or used with a second waveform in order for information to be recoverable. The baseband key may be used to modify the magnitude or phase of the transmitted waveform itself in order for information to be recoverable. The second waveform may be transmitted to the receiver or generated at the receiver by a known algorithm. Under certain specific conditions, the baseband waveform encryption operation may change the magnitude or phase of the plainbaseband signal such that some or all symbols are remapped. In other cases the magnitude or phase of the plainbaseband signal may be affected such that a normal receiver (without the baseband key or other modifications or enhancements) will not recognize a change in the symbols encoded.

In some embodiments, content may be encoded over a number of different wavelength channels and transmitted together, each may be combined appropriately for any of the content to the detectable. The encryption algorithm and baseband waveform encryption algorithm of each channel may be independent of each other.

While the foregoing examples describe the application of the encryption/decryption technique to digital communications, similar methodology may be applied when using analog signals. Nothing in this disclosure should therefore limit the embodiments above only to digital signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A communication device comprising:
a waveform encrypter configured to encrypt content with a time-varying baseband key to produce a cipherbaseband signal, the time-varying baseband key configured such that detection of the cipherbaseband signal without use of the time-varying baseband key renders the content unable to be reconstructed; and
a transceiver configured to transmit the cipherbaseband signal to one or more receivers, and configurable to transmit:
a timestamp used to determine the time-varying baseband key with the cipherbaseband signal when the time-varying baseband key remains the same between generation and transmission of the cipherbaseband signal, and
a manner in which the time-varying baseband key varies prior to transmission of the cipherbaseband signal or concurrent with and on a different channel than transmission of the cipherbaseband signal, the manner in which the time-varying baseband key varies transmitted in a predetermined position of cleartext or ciphertext,
wherein the predetermined position varies with one of a number of bits of the cleartext or ciphertext, or a time of transmission of the cleartext or ciphertext.

2. The communication device of claim 1, further comprising:
an encrypter configured to encrypt initial content using a time-invariant bit-level encryption algorithm prior to the content being provided to the waveform encrypter.

3. The communication device of claim 2, wherein:
the transceiver is configured to transmit an encryption key used by the time-invariant bit-level encryption algorithm to the one or more receivers prior to transmission of the cipherbaseband signal.

4. The communication device of claim 3, wherein:
the transceiver is configured to transmit the encryption key on a different channel than the cipherbaseband signal.

5. The communication device of claim 2, wherein:
the transceiver is configured to transmit a key used by the time-invariant bit-level encryption algorithm to the one or more receivers concurrently with transmission of the cipherbaseband signal on a different channel than the cipherbaseband signal.

6. The communication device of claim 2, wherein:
the encrypter is configured to encrypt the initial content using a an encryption key that varies with time, the encryption key different from the time-varying baseband key.

7. The communication device of claim 1, further comprising:
an encoder configured to encode initial content to produce the content for transmission prior to transmission of the cipherbaseband signal.

8. The communication device of claim 1, wherein:
the time-varying baseband key is configured to vary after encryption of a predetermined number of symbols, independent of an amount of time.

9. The communication device of claim 1, wherein:
the time-varying baseband key is configured to vary after a predetermined time, independent of an amount of data encrypted.

10. The communication device of claim 1, wherein:
the cipherbaseband signal is configured to vary by varying an amplitude or phase of the time-varying baseband key.

11. The communication device of claim 1, wherein the time-varying baseband key varies during transmission of the cipherbaseband signal.

12. A communication device comprising:
a transceiver configured to:
receive a cipherbaseband signal from a transmitter,
decrypt the cipherbaseband signal using a time-varying baseband key comprising a time-varying phase or amplitude to form a clearbaseband signal, and
receive another baseband key comprising a modulated reference local oscillator (LO) signal to measure a change of the cipherbaseband signal relative to the reference LO signal, the cipherbaseband signal configured to vary with time,
the transceiver configurable to receive a timestamp used to determine the time-varying baseband key with the cipherbaseband signal when the time-varying baseband key remains the same between generation and transmission of the cipherbaseband signal, and a manner in which the time-varying baseband key varies prior to reception of the cipherbaseband signal or concurrent with and on a different channel than reception of the cipherbaseband signal, the manner in which the time-varying baseband key varies received in a predetermined position of cleartext or ciphertext,
wherein the predetermined position varies with one of a number of bits of the cleartext or ciphertext, or a time of transmission of the cleartext or ciphertext.

13. The communication device of claim 12, further comprising:
a decrypter configured to decrypt the cipherbaseband signal using a time-invariant baseband waveform encryption algorithm.

14. The communication device of claim 13, wherein:
the transceiver is configured to receive the other baseband key for the time-invariant baseband waveform encryption algorithm prior to reception of the cipherbaseband signal.

15. The communication device of claim 14, wherein:
the transceiver is configured to receive the other key on a different channel than the cipherbaseband signal.

16. The communication device of claim 13, wherein:
the transceiver is configured to receive the other baseband key for the time-invariant encryption algorithm concurrently with transmission of the cipherwaveform, the cipherwaveform received on a different channel than the other baseband key.

17. The communication device of claim 12, wherein:
the time-varying decryption key is configured to vary after encryption of a predetermined number of symbols, independent of an amount of time.

18. The communication device of claim 12, wherein:
the time-varying baseband key is configured to vary after a predetermined time, independent of an amount of data encrypted.

19. A method of providing secure electronic content comprising:
encrypting binary bit level content using a time invariant encryption algorithm to form ciphertext;
encoding the ciphertext to form a plainbaseband signal;
baseband waveform encrypting the plainbaseband signal using a time-varying baseband key comprising at least one of a time-varying amplitude or phase to produce a cipherbaseband signal; and
transmitting the cipherbaseband signal to one or more receivers, and at least one of a timestamp used to determine the time-varying baseband key with the cipherbaseband signal when the time-varying baseband key remains the same between generation and transmission of the cipherbaseband signal, and a manner in which the time-varying baseband key varies prior to transmission of the cipherbaseband signal or concurrent with and on a different channel than transmission of the cipherbaseband signal, the manner in which the time-varying baseband key varies transmitted in a predetermined position of cleartext or ciphertext,
wherein the plainbaseband signal and a baseband key waveform of the time-varying baseband key are offset in time by one or more fractional bit periods prior to being combined, and an amount of offset varies in time.

20. The method of claim 19, further comprising:
decrypting the cipherbaseband signal at the one or more receivers using the time-varying baseband key, in which at least one of:
the time-varying baseband key comprises a modulated reference local oscillator (LO) signal to measure a change of the cipherbaseband signal relative to the modulated reference LO signal, and
the decrypting comprises combining the time-varying baseband key and cipherbaseband signal using an exclusive OR (XOR).

21. The method of claim 19, wherein one of:
the at least one of the time-varying amplitude or phase is configured to vary after baseband waveform encryption of a predetermined number of symbols, independent of an amount of time, or
the at least one of the time-varying amplitude or phase is configured to vary after a predetermined time independent of an amount of baseband waveform encrypted.

* * * * *

UNITED STATES PATENT AND TRADEMARK OFFICE
CERTIFICATE OF CORRECTION

Page 1 of 1

PATENT NO. : 10,285,049 B2
APPLICATION NO. : 14/950552
DATED : May 7, 2019
INVENTOR(S) : Kowalevicz et al.

It is certified that error appears in the above-identified patent and that said Letters Patent is hereby corrected as shown below:

In the Specification

Column 10, Line 14, delete "510" and insert --508-- therefor

Column 10, Line 17, delete "510." and insert --508.-- therefor

Column 11, Line 30, delete "608" and insert --606-- therefor

Column 11, Line 44, delete "606" and insert --608-- therefor

Column 12, Line 1, delete "610" and insert --612-- therefor

Column 12, Line 46, after "cipherbaseband", insert --signal--

In the Claims

Column 14, Line 65, Claim 6, before "an", delete "a"

Signed and Sealed this
Twelfth Day of January, 2021

Andrei Iancu
*Director of the United States Patent and Trademark Office*